United States Patent
Moreno

(10) Patent No.: US 11,926,250 B2
(45) Date of Patent: Mar. 12, 2024

(54) SLEEVE FOR HEADREST

(71) Applicant: ILLINOIS TOOL WORKS INC., Glenview, IL (US)

(72) Inventor: Albert Moreno, Barcelona (ES)

(73) Assignee: Illinois Tool Works Inc., Glenview, IL (US)

( * ) Notice: Subject to any disclaimer, the term of this patent is extended or adjusted under 35 U.S.C. 154(b) by 107 days.

(21) Appl. No.: 17/202,525

(22) Filed: Mar. 16, 2021

(65) Prior Publication Data

US 2021/0300223 A1    Sep. 30, 2021

(30) Foreign Application Priority Data

Mar. 24, 2020  (EP) .................................... 20165384
Feb. 5, 2021  (EP) .................................... 21155572

(51) Int. Cl.
*B60N 2/897* (2018.01)
*B29C 45/16* (2006.01)
*B29L 31/30* (2006.01)

(52) U.S. Cl.
CPC .......... *B60N 2/897* (2018.02); *B29C 45/1676* (2013.01); *B29L 2031/3023* (2013.01)

(58) Field of Classification Search
CPC ................ B60N 2/897; B29C 45/1676; B29L 2031/3023
See application file for complete search history.

(56) References Cited

U.S. PATENT DOCUMENTS

| 5,944,170 | A | 8/1999 | LaVeine | |
| 6,454,356 | B1 * | 9/2002 | Yamada | B60N 2/815 |
| | | | | 297/391 |
| 7,165,814 | B2 * | 1/2007 | Gans | B60N 2/826 |
| | | | | 297/391 |
| 7,370,915 | B2 * | 5/2008 | Droche | B60N 2/818 |
| | | | | 297/391 |
| 7,434,886 | B2 * | 10/2008 | Yamada | B60N 2/818 |
| | | | | 297/391 |
| 9,187,017 | B2 * | 11/2015 | Ronzi | B60N 2/818 |
| 9,902,301 | B2 | 2/2018 | Aquillue | |
| 10,351,032 | B2 * | 7/2019 | Wehling | B60N 2/809 |
| 2006/0012225 | A1 * | 1/2006 | Gans | B60N 2/80 |
| | | | | 297/41 |
| 2006/0119163 | A1 | 6/2006 | Gans | |
| 2006/0163931 | A1 | 7/2006 | Yamada | |
| 2018/0178697 | A1 | 6/2018 | Wehling | |

FOREIGN PATENT DOCUMENTS

| CN | 201961194 U | 9/2011 |
| DE | 29801357 U1 | 6/1998 |
| EP | 0875471 A1 | 11/1998 |

(Continued)

*Primary Examiner* — Philip F Gabler
(74) *Attorney, Agent, or Firm* — THOMPSON HINE LLP

(57) ABSTRACT

A sleeve device for a headrest, the device including a sleeve body for insertion into a vehicle seat, the sleeve body including a tubular wall describing an inner axial passage and a rod-engaging portion which is deformable inwardly relative to the tubular wall, the rod-engaging portion including a flexible pad on its external side, wherein the pad is configured to be urged, in use, to force the engaging portion into the axial passage and/or against a rod received within the axial passage.

17 Claims, 3 Drawing Sheets

(56) References Cited

FOREIGN PATENT DOCUMENTS

| | | |
|---|---|---|
| EP | 1609665 | 12/2005 |
| EP | 1609665 A2 | 12/2005 |
| EP | 1652723 A2 | 5/2006 |
| EP | 2749448 | 7/2014 |
| FR | 2917681 A1 | 12/2008 |
| FR | 2936749 A1 | 4/2010 |
| JP | 1089665 A | 4/1998 |
| WO | WO-2016166009 A1 | 10/2016 |

* cited by examiner

SLEEVE FOR HEADREST

TECHNICAL FIELD

This invention relates generally to a sleeve for a headrest. More specifically, although not exclusively, this invention relates to such a sleeve with tolerance compensation for vehicle seats.

BACKGROUND

Headrests installed on the seat back rests of vehicles usually have two parallel spaced rods of the headrest inserted into sleeve arrangements for the headrest, which are fixed on the frame of the back rest. The headrest rods are often bent in a U-shape, with the U-shaped portion is located inside of the headrest.

Known tolerance compensation sleeves for headrests include a sleeve body to be inserted into an opening in a frame of a vehicle seat. The sleeve body includes an inner axial passage to accommodate a rod of the headrest and an external side which cooperates with the opening of the frame.

The sleeve body is fixed in a frame of the back rest of the seat, and it is thus subject to tolerances. The sleeve device and the U-shaped rods are also subject to tolerances when it is manufactured. These tolerances can result in slack between the rods and the sleeve body and/or misalignment between the rod pair and sleeve pair. The rods may need to be bent, either away from each other or towards each other, such that they are then no longer parallel.

In order to compensate for these tolerances whilst minimising the slack between the rods and sleeve body, it is known to pre-stress the headrest rods inside the sleeve body by a resilient element and/or to provide a low friction sleeve to reduce the clearance between them. Examples of such arrangements are shown in EP1609665 and EP2749448. These arrangements are configured to regulate the sliding movement of the rod within the axial inner passage of the sleeve body and to take up the slack between them.

It would be advantageous to provide an alternative arrangement that is superior and/or simpler and/or more cost effective than known arrangements.

SUMMARY

Accordingly, a first aspect of the invention provides a sleeve device for a headrest, the device comprising a sleeve body for insertion into a vehicle seat, the sleeve body comprising a tubular wall describing/defining an inner axial passage and an engaging portion, e.g. a rod-engaging portion, which is deformable inwardly relative to the tubular wall, the engaging portion comprising a pad, e.g. a flexible pad, on its external side, wherein the pad is configured to be urged, in use, to force the engaging portion into the axial passage and/or against a rod received within the axial passage.

The tubular wall and/or engaging portion may be formed of a first material. The pad may be formed of a second material. The second material may be more flexible or softer than the first material and/or the first material may be less flexible or more rigid than the second material. The pad may be formed only on the engaging portion.

It has been observed that the use of a pad on the external side of the engaging portion provides a very effective means of tolerance compensation. The sleeve body, and rod engaging portion can be formed of a material having low friction qualities, to enable the headrest rod to translate with minimal friction within the passage. The material of the pad can therefore be selected to optimise flexibility, without any deleterious effects on the headrest rod's ability to translate.

It has also been observed that this arrangement is surprisingly effective at damping vibrations in the headrest in use. The material of the pad can be selected to optimise its ability to take up any vibrations within the headrest assembly, during use.

The pad may be mechanically connected or bonded to, e.g. adhesively bonded to, or formed integrally with the tubular wall or engaging portion. The pad may be moulded on or to or onto the tubular wall or engaging portion. The pad may be co-moulded on or to or onto the tubular wall or engaging portion. Preferably, the pad is moulded on or to or onto the tubular wall or engaging portion by a two-shot or twin-shot or 2k moulding process. The tubular wall and/or the engaging portion may be formed of a plastics material, e.g. a rigid or semi-rigid plastics material. The first material may comprise a plastics material, e.g. a rigid or semi-rigid plastics material. The pad may be formed of an elastomeric material. The pad may be formed of a thermoplastic elastomer (TPE), thermoplastic polyurethane (TPU) or any other suitable material. The pad may be formed of a natural or synthetic rubber material.

The tubular wall or engaging portion may comprise a recess or depression. The pad may be mounted to or formed on or in the recess or depression. The pad may project from the tubular wall and/or engaging portion and/or recess and/or depression. The tubular wall may comprise an external surface, for example a circumferential external surface.

The pad may project outwardly from or relative to the circumferential external surface, e.g. such that the pad engages, in use, a frame within which the sleeve body is received. The pad engaging the frame may force the engaging portion into the axial passage and/or against a rod received within the axial passage. Alternatively, the sleeve device may comprise an abutment, such as a flange or an outer wall, which may be configured to engage the pad, thereby to force the engaging portion into the axial passage and/or against a rod received within the axial passage.

The tubular wall may comprise one or more interruption(s), cut-out(s) or slot(s), which may be or extend through the tubular wall and/or describe at least part of the engaging portion. The engaging portion may be integral with the tubular wall and/or formed of the same material. The engaging portion may comprise a deformable, e.g. resiliently deformable, arm or tongue. The engaging portion may comprise a deformable arm or tongue having a free end. Alternatively, the engaging portion may comprise a deformable, e.g. resiliently deformable, length or band, each end of which may be secured to and/or integral with the tubular wall. The tubular wall may comprise a pair of interruptions, cut-outs or slots, e.g. between which the engaging portion may be described. The engaging portion may be deformable through a cut-out in the tubular wall.

The device or sleeve body may comprise a head or a head portion. The head or head portion may comprise a flange, which may project from the tubular wall, e.g. one end of the tubular wall. The device may comprise one or more securing feature(s), for example one or more barbs. The securing feature(s) may be adjacent and/or spaced from the head. The or each securing feature may comprise an engaging end or surface, which may be spaced from the head. The device or sleeve body may be configured to captivate, in use, part of a frame of a vehicle seat between the head and the securing feature(s) or engaging end(s) or surface(s). The or each securing feature may comprise a lead in, which may be on the opposite side thereof to the engaging end or surface.

Another aspect of the invention provides a headrest post assembly comprising the sleeve device described above. The headrest post assembly may comprise a frame or frame portion, e.g. within which the sleeve device may be received.

Another aspect of the invention provides a seat assembly comprising the sleeve device described above. The seat assembly may comprise a frame, e.g. within which the sleeve device may be received.

Another aspect of the invention provides a vehicle comprising the seat assembly described above.

Another aspect of the invention provides a method of making a sleeve device for a headrest, the method comprising moulding a sleeve body including a tubular wall describing an inner axial passage and a rod engaging portion which is deformable inwardly relative to the tubular wall and moulding a flexible pad onto an external side of the engaging portion using a second material which is more flexible than the first material.

The method may comprise moulding the sleeve device using a two-shot or twin-shot or 2k injection moulding process.

Another aspect of the invention provides a method of assembling a seat assembly, the method comprising inserting a tubular wall of a sleeve device into a vehicle seat such a flexible pad of the device is urged to force an engaging portion of the tubular wall into an axial passage described by the tubular wall.

For the avoidance of doubt, any of the features described herein apply equally to any aspect of the invention.

Another aspect of the invention provides a computer program element comprising and/or describing and/or defining a three-dimensional design for use with a simulation means or a three-dimensional additive or subtractive manufacturing means or device, e.g. a three-dimensional printer or CNC machine, the three-dimensional design comprising an embodiment of the sleeve device described above.

A yet further aspect of the invention provides the computer program element embodied on a computer readable medium.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible.

For the avoidance of doubt, the terms "may", "and/or", "e.g.", "for example" and any similar term as used herein should be interpreted as non-limiting such that any feature so-described need not be present. Indeed, any combination of optional features is expressly envisaged without departing from the scope of the invention, whether or not these are expressly claimed. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

Embodiments of the invention will now be described by way of example only with reference to the accompanying drawings in which.

DETAILED DESCRIPTION

Figure 1:
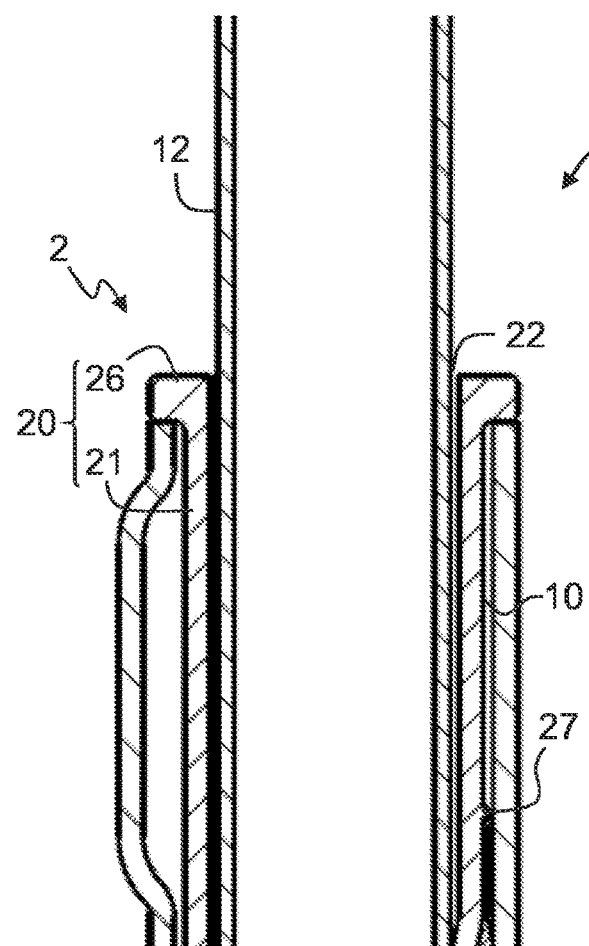
FIG. 1 is a cross-sectional view taken along the longitudinal axis of a headrest post assembly incorporating a sleeve device according to one example.
Figure 2:
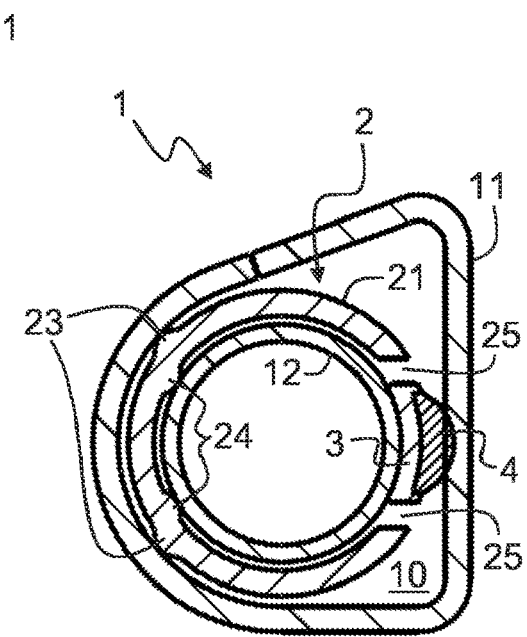
FIG. 2 is a transverse cross-sectional view of the headrest post assembly of FIG. 1, which is taken along a plane perpendicular to the longitudinal axis.
Figure 3:
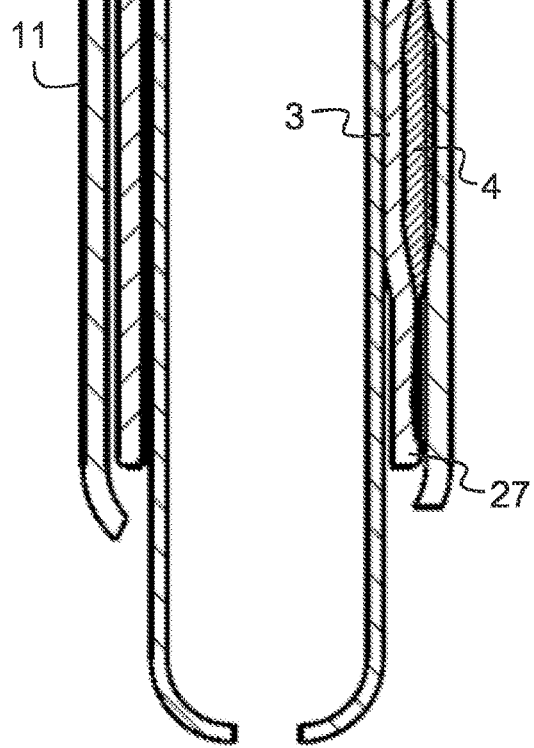
FIG. 3 is a perspective view of the sleeve device of FIGS. 1 and 2.

Referring now to FIGS. 1 to 3, there is shown a headrest post assembly 1 including a sleeve device 2 received in an opening 10 in a frame tube 11 of a vehicle seat (not shown) and a rod 12 connected to a headrest (not shown) received within the sleeve device 2. The sleeve device 2 includes a sleeve body 20 having a tubular wall 21 with a resiliently deformable band 3 and a flexible pad 4 on an external side of the band 3.

The tubular wall 21 of the sleeve body 20 describes an inner axial passage 22 within which the rod 12 is received. The tubular wall 21 includes a pair of outer, axial ribs 23 and a pair of inner, axial ribs 24, both of which are on the opposite side of the tubular wall 21 to the band 3. The outer, axial ribs 23 engage facing portions of the inner surface of the frame tube 11. The inner, axial ribs 24 are substantially aligned with the outer, axial ribs 23 and engage an outer surface of the rod 12.

The tubular wall 21 also includes a pair of axial slots 25 through its thickness, which describe the deformable band 3 therebetween. More specifically, the slots 25 separate a band 3 of material from the rest of the tubular wall 21, whilst each end of the band 3 remains integral therewith. The band 3 can therefore be stretched inwardly, or indeed outwardly, to deform relative to the rest of the tubular wall 21.

The sleeve body 20 also includes a head 26 formed by a radial flange projecting outwardly from the tubular wall 21. In this example, the head 26 is substantially triangular in shape to match the shape of the opening 10 in the frame tube 11, which is shown more clearly in FIG. 2. As such, the head 26 covers the opening 10 when the sleeve device 2 is inserted therein. The sleeve body 20 is formed of a first, rigid or semi-rigid plastics material in this example.

The pad 4 is formed of a second, flexible material, for example an elastomeric material such as a thermoplastic elastomer (TPE), in this example. The pad 4, shown in cross-section in FIG. 2, is formed as a ridge, moulded onto an external side of the band 3. The tubular wall 21 and band 3 include a lip 27 surrounding a zone of fusion between the material of the band 3 and that of the pad 4. The lip 27 describes a recess in the material of the band 3. The sleeve body 20 and pad 4 are formed using a two-shot or twin-shot injection moulding process, generally referred to as a 2k moulding process by those skilled in the art. The skilled person will readily appreciate the advantages associated with this process, including those related to both manufacturability and the reliability of the bond between the materials.

The pad 4 projects outwardly from the band 3, beyond the circumferential external surface tubular wall 21. As such, when the sleeve device 2 is inserted into the opening 10, the internal surface of the frame tube 11 engages the pad 4, which urges and deforms the band 3 into the axial passage 22. When the rod 12 is inserted into the axial passage 22, the band 3 is therefore urged against the rod 12 to take up any slack and thereby provide a tight fit between the rod 12 and the sleeve device 2.

The band 3 therefore provides a rod-engaging portion 3 of the sleeve device 2, which is configured to regulate the sliding movement of the rod 12 within the axial inner passage 22 of the sleeve body 20, and to take up the slack between them. The pad 4 has also been found to be surprisingly effective at damping vibrations in the headrest post assembly 1, in use.

As illustrated in FIG. 3, the sleeve device 2 according to this example also includes a securing feature 28, which is in the form of a barb-shaped projection in this example. The securing feature 28 is adjacent and spaced from the head 26 and includes an engaging end surface 28a facing the head 26 which captivates part of a frame tube 11 between the head 26 and the engaging end surface 28a. The securing feature 28 also includes a lead in 28b on the opposite side of the head 26 to facilitate insertion of the sleeve device 2 into the frame tube 11.

Figure 4:
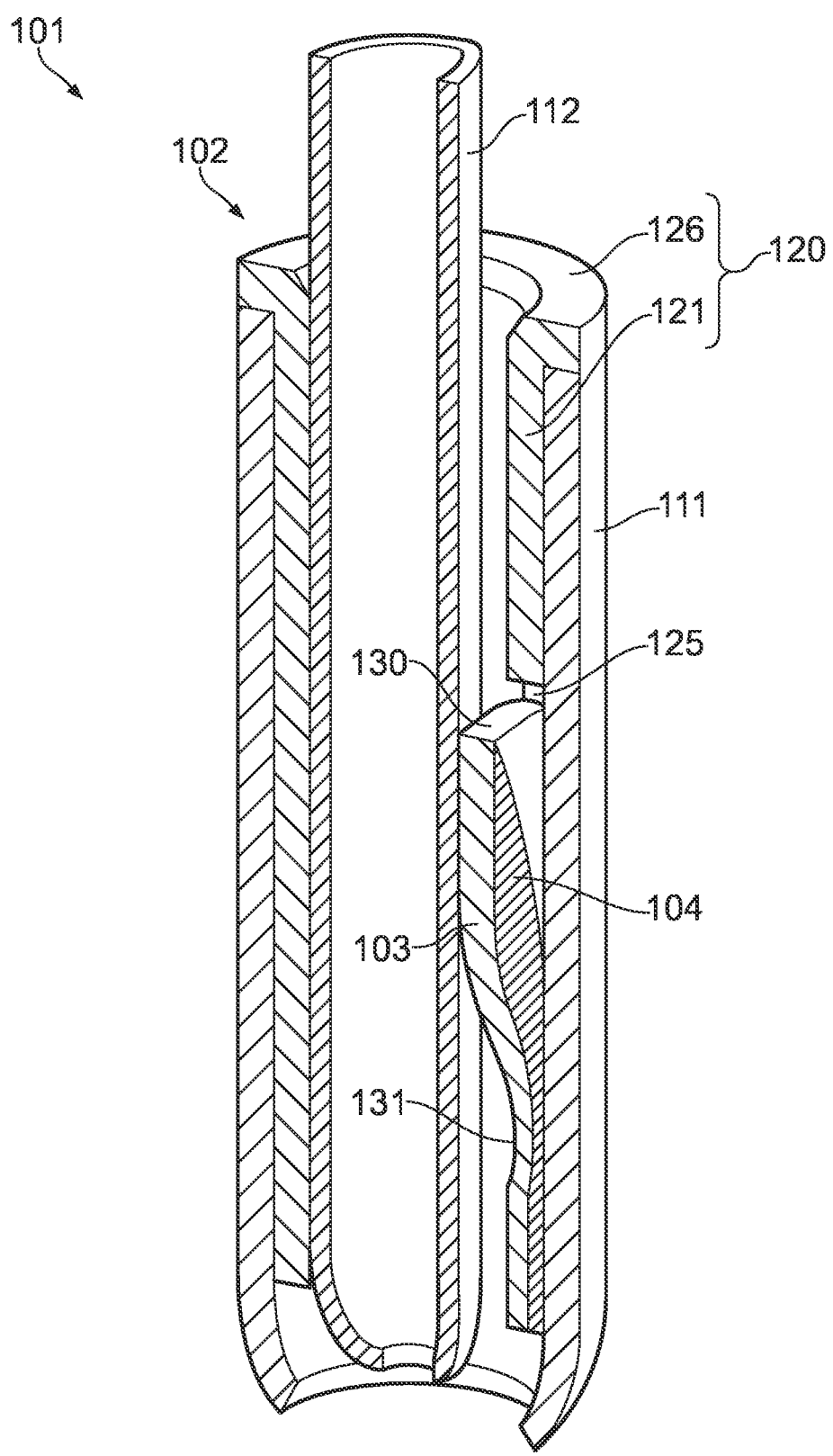
FIG. 4 is a sectional perspective view of a headrest post assembly incorporating a sleeve device according to another example.
Figure 5:
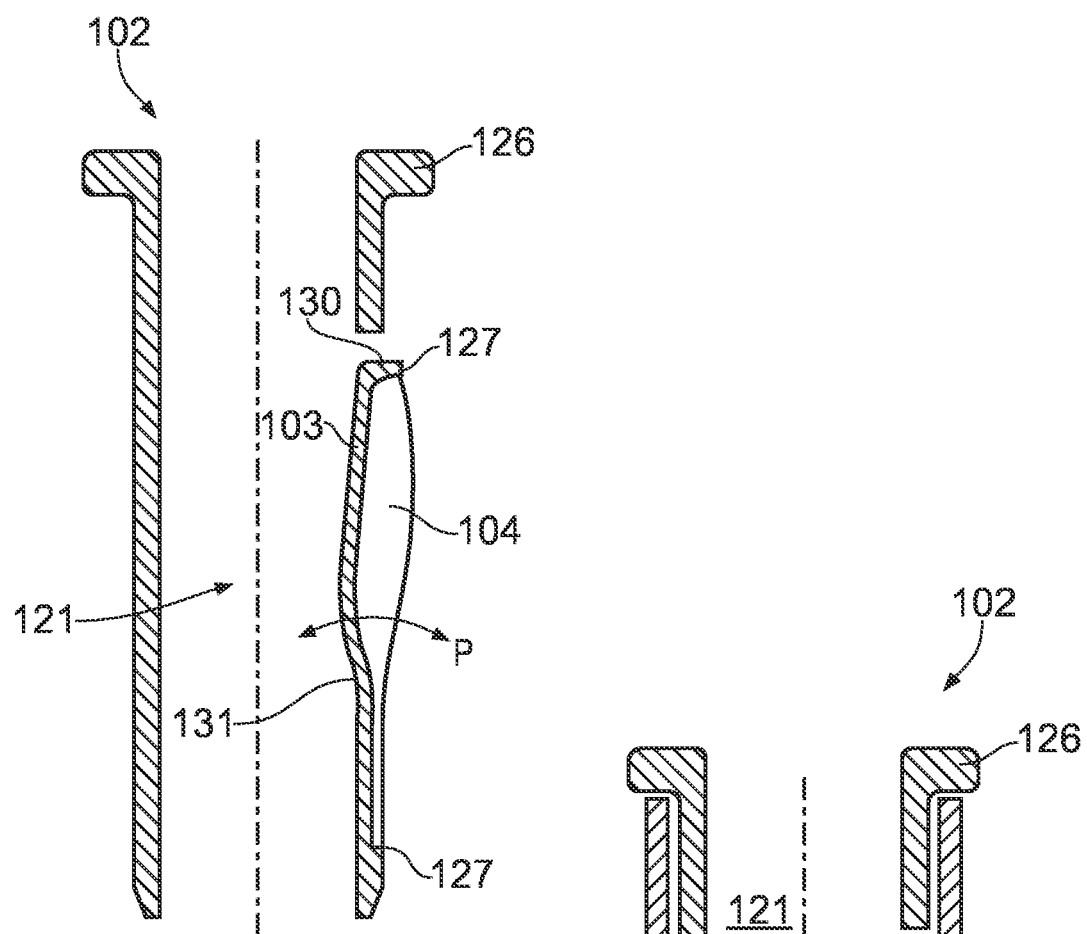
FIG. 5 is a cross-sectional view taken along the longitudinal axis of the sleeve device shown in FIG. 4.
Figure 6:
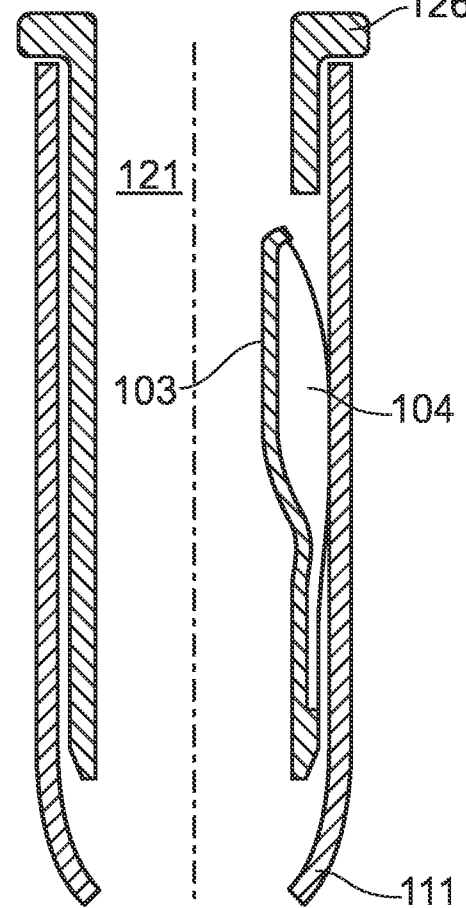
FIG. 6 is a cross-sectional view similar to that of FIG. 5 with the sleeve device received within the opening in the frame.

Referring now to FIGS. 4 to 6, there is shown a headrest post assembly 101 according to another example. The headrest post assembly 101 according to this example is similar to the headrest post assembly 1 described above, wherein like features are labelled with like references, incremented by 100.

The headrest post assembly 101 according to this example differs from that of FIGS. 1 to 3 in that the rod-engaging portion 103 of the sleeve device 102 is in the form of a deformable tongue 103, as opposed to the deformable band 3 of the sleeve device 2 described above. The deformable tongue 103 is similar to the deformable band 3 and performs a similar function, but it includes a free end 130.

This permits the tongue 103 to pivot P about its other end 131, which forms a live hinge connection with the tubular wall 121. As such, the tongue 103 is able to deform to a greater extent than the deformable band 3. This enables the sleeve device 102 to accommodate a larger gap between the axial inner passage 122 of the sleeve body 120 and the rod 112.

It will be appreciated by those skilled in the art that several variations to the aforementioned embodiments are envisaged without departing from the scope of the invention. It will also be appreciated by those skilled in the art that any number of combinations of the aforementioned features and/or those shown in the appended drawings provide clear advantages over the prior art and are therefore within the scope of the invention described herein.

What is claimed is:

1. A sleeve device for a headrest, the device comprising a sleeve body for insertion into a vehicle seat, the sleeve body comprising a tubular wall describing an inner axial passage and a rod-engaging portion which is deformable inwardly relative to the tubular wall, the rod-engaging portion comprising an internal side and an external side, with a flexible pad on the external side, wherein the flexible pad is configured to be urged, in use, to force the rod-engaging portion into the axial passage and/or against a rod received within the axial passage;

wherein the rod-engaging portion is elongated in a direction of a longitudinal axis of the axial passage so as to provide elongated projection into the axial passage and/or elongated engagement against a rod received within the axial passage;

wherein the rod-engaging portion has a rod-engaging length that is at least 20% of a length of the tubular wall, wherein the flexible pad extends axially along an entirety of the rod-engaging length at the external side so as to urge the rod-engaging portion against the rod along the entirety of the rod-engaging length.

2. The sleeve device of claim 1, wherein the rod-engaging portion is formed of a first material and the pad is formed of second material, which is more flexible than the first material and is moulded over the rod-engaging portion such that the pad and the rod-engaging portion are fused to one another.

3. The sleeve device of claim 2, wherein the tubular wall comprises a circumferential external surface and the pad projects outwardly relative to the circumferential external surface such that the pad engages, in use, a frame within which the sleeve body is received, thereby forcing the rod-engaging portion into the axial passage and/or against a rod received within the axial passage.

4. The sleeve device of claim 3, wherein the rod-engaging portion is integral with the tubular wall and defined at least in part by at least one interruption or slot, the pad being formed only on the rod-engaging portion.

5. The sleeve device of claim 4, wherein the rod-engaging portion comprises a resiliently deformable arm or tongue having a free end.

6. The sleeve device of claim 4, wherein the rod-engaging portion comprises a resiliently deformable band defined between a pair of elongated slots through the tubular wall, each end of the band being integral with the tubular wall.

7. The sleeve device of claim 1, wherein the tubular wall and the flexible pad include a lip surrounding a zone of fusion between the flexible pad and the rod-engaging portion, the lip defining a recess in a material of the rod engaging portion.

8. A sleeve device for a headrest, the device comprising a sleeve body for insertion into a vehicle seat, the sleeve body comprising a tubular wall describing an inner axial passage and a rod-engaging portion which is deformable inwardly relative to the tubular wall, the rod-engaging portion comprising an internal side and an external side, with a flexible pad on the external side, wherein the flexible pad is configured to be urged, in use, to force the rod-engaging portion into the axial passage and/or against a rod received within the axial passage;

wherein the rod-engaging portion is part of the tubular wall such that the tubular wall and the rod-engaging portion are formed of a same material;

wherein the flexible pad is formed of a material that is different than the material forming the rod-engaging portion;

wherein the rod-engaging portion has a rod-engaging length, wherein the rod-engaging portion is in contact with the rod continuously along the rod-engaging length, and the rod-engaging length is at least 20% of a length of the tubular wall;

wherein the rod-engaging portion is integral with the tubular wall and located between circumferentially spaced apart first and second elongated axial slots in the tubular wall, wherein, in an axial region of the rod-engaging portion, the tubular wall extends continuously from the first elongated axial slot to the second elongated axial slot such that the tubular wall is continuous on a side of the tubular wall that is diametrically opposite the rod-engaging portion.

9. The sleeve device of claim 8, wherein the same material is a rigid or semi-rigid plastics material.

10. The sleeve device of claim 8, wherein the rod-engaging portion is elongated in a direction of a longitudinal axis of the axial passage so as to provide elongated projection into the axial passage and/or elongated engagement against a rod received within the axial passage.

11. The sleeve device of claim 8, wherein the flexible pad extends axially beyond the rod-engaging portion.

12. A sleeve device for a headrest, the device comprising a sleeve body for insertion into a vehicle seat, the sleeve body comprising a tubular wall describing an inner axial passage and a rod-engaging portion which is deformable inwardly relative to the tubular wall, the rod-engaging portion comprising an internal side and an external side, with a flexible pad on the external side, wherein the flexible pad is configured to be urged, in use, to force the rod-engaging portion into the axial passage and/or against a rod received within the axial passage;
wherein the flexible pad is formed of a material that is different than a material forming the rod-engaging portion;
wherein the rod-engaging portion has a rod-engaging length, wherein the rod-engaging portion is in contact with the rod continuously along the rod-engaging length, wherein the rod-engaging length that is at least 20% of a length of the tubular wall, wherein the flexible pad extends along an entirety of the rod-engaging length at the external side so as to urge the rod-engaging portion against the rod along the entirety of the rod-engaging length.

13. The sleeve device of claim 12, wherein the rod-engaging portion is formed by part of the tubular wall such that the tubular wall and the rod-engaging portion are formed of a same material, wherein the rod-engaging portion is elongated in a direction of a longitudinal axis of the axial passage so as to provide elongated projection into the axial passage and/or elongated engagement against a rod received within the axial passage.

14. The sleeve device of claim 12, wherein the rod-engaging portion comprises a resiliently deformable band defined between a pair of elongated axial slots through the tubular wall, wherein the rod-engaging portion includes a first axial end and a second axial end, wherein each of the first axial end and the second axial end is integrally connected with the tubular wall.

15. The sleeve device of claim 12, wherein the rod-engaging portion is a single rod-engaging portion that is the only portion of the tubular wall that is deformable inwardly relative to the tubular wall.

16. The sleeve device of claim 12, wherein the rod-engaging portion is integral with the tubular wall and located between circumferentially spaced apart first and second elongated axial slots in the tubular wall, wherein, in an axial region of the rod-engaging portion, the tubular wall extends continuously from the first elongated axial slot to the second elongated axial slot such that the tubular wall is continuous on a side of the tubular wall that is diametrically opposite the rod-engaging portion.

17. The sleeve device of claim 1, wherein the rod-engaging portion is integral with the tubular wall and located between circumferentially spaced apart first and second elongated axial slots in the tubular wall, wherein, in an axial region of the rod-engaging portion, the tubular wall extends continuously from the first elongated axial slot to the second elongated axial slot such that the tubular wall is continuous on a side of the tubular wall that is diametrically opposite the rod-engaging portion.

* * * * *